US012705490B2

(12) United States Patent
Ji et al.

(10) Patent No.: US 12,705,490 B2
(45) Date of Patent: Aug. 11, 2026

(54) TRAINING DISTILLED MACHINE LEARNING MODELS USING A PRE-TRAINED FEATURE EXTRACTOR

(71) Applicant: Waymo LLC, Mountain View, CA (US)

(72) Inventors: Ming Ji, Palo Alto, CA (US); Edward Stephen Walker, Jr., San Francisco, CA (US); Yang Song, San Jose, CA (US); Zijian Guo, Sunnyvale, CA (US); Congcong Li, Cupertino, CA (US)

(73) Assignee: Waymo LLC, Mountain View, CA (US)

(*) Notice: Subject to any disclaimer, the term of this patent is extended or adjusted under 35 U.S.C. 154(b) by 1202 days.

(21) Appl. No.: 17/313,655

(22) Filed: May 6, 2021

(65) Prior Publication Data

US 2022/0366263 A1 Nov. 17, 2022

(51) Int. Cl.
*G06N 3/088* (2023.01)
*G06N 3/045* (2023.01)

(52) U.S. Cl.
CPC ............. *G06N 3/088* (2013.01); *G06N 3/045* (2023.01)

(58) Field of Classification Search
CPC ...... G06N 3/088; G06N 3/045; G06N 3/0464; G06N 3/0895; G06N 3/09; G06N 3/084;
(Continued)

(56) References Cited

U.S. PATENT DOCUMENTS

2015/0356461 A1 12/2015 Vinyals et al.
2019/0205748 A1 7/2019 Fukuda et al.
(Continued)

FOREIGN PATENT DOCUMENTS

CN 109829375 A 5/2019
CN 111598253 A 8/2020
(Continued)

OTHER PUBLICATIONS

D. Feng et al., "Deep Multi-Modal Object Detection and Semantic Segmentation for Autonomous Driving: Datasets, Methods, and Challenges," in IEEE Transactions on Intelligent Transportation Systems, vol. 22, No. 3, pp. 1341-1360, Mar. 2021 (Year: 2021).*
(Continued)

*Primary Examiner* — Tewodros E Mengistu
(74) *Attorney, Agent, or Firm* — Fish & Richardson P.C.

(57) ABSTRACT

Methods, systems, and apparatus, including computer programs encoded on a computer storage medium, for training a student machine learning model using a teacher machine learning model that has a pre-trained feature extractor. In one aspect, a method includes obtaining data specifying the teacher machine learning model that is configured to perform a machine learning task; obtaining first training data; training the teacher machine learning model on the first training data to obtain a trained teacher machine learning model; generating second, automatically labeled training data by using the trained teacher machine learning model to process unlabeled training data; and training a student machine learning model to perform the machine learning task using at least the second, automatically labeled training data, wherein the student machine learning model does not include the pre-trained feature extractor and instead includes a different feature extractor having fewer parameters than the pre-trained feature extractor.

20 Claims, 4 Drawing Sheets

(58) Field of Classification Search
CPC ........ G06N 3/08; G06N 20/00; G06V 10/764; G06V 10/82
See application file for complete search history.

(56) References Cited

U.S. PATENT DOCUMENTS

| | | | | |
|---|---|---|---|---|
| 2020/0334520 | A1* | 10/2020 | Chen | G06F 40/20 |
| 2020/0364617 | A1 | 11/2020 | Luong et al. | |
| 2020/0401929 | A1 | 12/2020 | Duerig et al. | |
| 2021/0407090 | A1* | 12/2021 | Li | G06N 3/045 |
| 2022/0261593 | A1* | 8/2022 | Yu | G06F 18/214 |
| 2022/0301310 | A1* | 9/2022 | Kim | G06V 10/82 |
| 2023/0281974 | A1* | 9/2023 | Ramamonjison | G06V 10/764 382/157 |

FOREIGN PATENT DOCUMENTS

| | | | |
|---|---|---|---|
| CN | 111931819 | A | 11/2020 |
| CN | 112508169 | A | 3/2021 |

OTHER PUBLICATIONS

Feng, Di, et al. "Deep multi-modal object detection and semantic segmentation for autonomous driving: Datasets, methods, and challenges." IEEE Transactions on Intelligent Transportation Systems 22.3 (2020): 1341-1360. (Year: 2020).*

Passalis et al., "Learning deep representations with probabilistic knowledge transfer," Proceedings of the 15th European Conference on Computer Vision, Munich, Germany, Sep. 8-14, 2018, Mar. 2019, 17 pages.

Extended Search Report in European Appln. No. 22169856.6, dated Oct. 10, 2022, 10 pages.

Huang et al., "Weakly supervised segmentation via instance-aware propagation," Neurocomputing, Apr. 2021, 447:1-9.

Zhao et al., "Single-shot weakly-supervised object detection guided by empirical saliency model," Neurocomputing, Mar. 2021, 455:431-440.

Office Action in Chinese Appln. No. 202210486139.6, mailed on Sep. 29, 2025, 16 pages (with English translation).

* cited by examiner

TRAINING DISTILLED MACHINE LEARNING MODELS USING A PRE-TRAINED FEATURE EXTRACTOR

BACKGROUND

This specification relates to training machine learning models, e.g., for deployment on-board autonomous vehicles.

Autonomous vehicles include self-driving cars, boats, and aircraft. Autonomous vehicles use a variety of on-board sensors and computer systems to detect nearby objects and their respective characteristics (position, shape, heading, speed, etc.) and use such detections to make control and navigation decisions.

Some autonomous vehicles have computer systems that implement neural networks for object detection or classification within sensor data.

A machine learning model receives input and generates an output based on the received input and on values of the parameters of the model. For example, machine learning models may receive an image and generate a score for each of a set of classes, with the score for a given class representing a probability that the image contains an image of an object that belongs to the class.

The machine learning model may be composed of, e.g., a single level of linear or non-linear operations or may be a deep network, i.e., a machine learning model that is composed of multiple levels, one or more of which may be layers of non-linear operations. An example of a deep network is a neural network with one or more hidden layers.

SUMMARY

This specification generally describes a system implemented as one or more computers programs on one or more computers in one or more locations that trains a student machine learning model (or, for short, "student model") using a teacher machine learning model (or, for short, "teacher model") to perform a first machine learning task.

During the training of the student machine learning model to perform the first task, the system uses both ground truth outputs and teacher outputs generated by the already trained teacher machine learning model.

In particular, the teacher machine learning model is a machine learning model that has a feature extractor that has been pre-trained as part of a different machine learning model that is configured, e.g., through training, to perform a different, second machine learning task. That is, a portion of the teacher machine learning model can be instantiated according to the known architecture of the different machine learning model and the known, e.g., trained, values of parameters of the different machine learning model.

For example, the first machine learning task can be an object classification or detection task where the teacher or student machine learning model can perform the task by processing an input that includes visual data such as image or point cloud data to generate a classification or detection output, and the second machine learning task can be any of a variety of image understanding tasks. The requirements and specifics of different image understanding tasks may vary, but typically, performing an image understanding task by the different machine learning model can include processing an input that includes image data to recognize or locate a given set of attributes or other higher-level features of the image data. As one particular example, the second task can be a task to predict the relevance of different images with respect to some given text, e.g., a received search query. As another particular example, the second task can be an object localization task to identify locations of one or more objects that are present in image data (but without classifying the one or more objects).

In general, the feature extractor is configured to process an input of the second machine learning task, data derived from the input, or both to generate an embedding of the input, and the second machine learning model can perform the different task by generating an output for the second task from the embedding generated by the feature extractor. In this specification, an embedding is an ordered collection of numeric values that represents an input in a particular embedding space. For example, an embedding can be a data structure, e.g., a vector, of floating point or other numeric values that has a fixed dimensionality.

Particular embodiments of the subject matter described in this specification can be implemented so as to realize one or more of the following advantages.

A distilled student machine learning model that is easier to deploy than a cumbersome teacher machine learning model, i.e., because it requires less computation, memory, or both, to generate outputs at run time than the cumbersome teacher machine learning model, can be trained using the cumbersome teacher model that has already been trained. Once trained using the teacher machine learning model, the student machine learning model can generate outputs that are equally as good or even better than the outputs generated by the teacher machine learning model despite being easier to deploy or using fewer computational resources than the teacher machine learning model. A student machine learning model is thus suitable for deployment on a device with limited computational power or resources, for example, on an on-board system of a vehicle or robot or on a smartphone, tablet, smart speaker or other smart device.

To perform training for a particular machine learning task using knowledge distillation, however, it is often required to train cumbersome (e.g., large, or deep) teacher machine learning models using large amounts of labelled training data so that the teacher model attains an acceptable level of performance on a target task. Such requirements are often impractical. In some cases an appropriate architecture of a teacher machine learning model may be difficult to determine, e.g., either through a tedious and time-consuming hand-design process or even with some automated architecture search techniques. In other cases the large machine learning model may be computationally costly to train before it can be practically used in training the student machine learning model. In addition, large amounts of labelled training data applicable to the particular task is not always available.

On the other hand, for any of a variety of machine learning tasks that are different from the particular task, there may exist one or more specialist feature extractors that have been configured, e.g., through training, to generate extracted features, e.g., in the form of embeddings, from the input for the different task that can assist in a different machine learning model to attain at least a threshold level of performance on the different task by processing the extracted features. For example, the specialist feature extractor (e.g., as part of the different machine learning model) and the teacher machine learning model may be respectively configured to perform distinct tasks that both belong to a common domain or field, e.g., the field of digital image processing or machine perception. For example, the specialist feature extractor and the teacher machine learning model may be configured to process model inputs that are of a same type or modality (but configured to generate different types of outputs).

By instantiating at least a portion of the teacher machine learning model according to the architecture and parameter values of such fully trained, specialist feature extractors, the training system described in this specification can train the student machine learning model in a more computationally efficient manner than other existing training systems that uses knowledge distillation. For example, the human labor required to hand-design the teacher machine learning model can be reduced. As another example, the amount of computational resources, the amount of task-specific labelled training data, or both that are required to train the teacher machine learning model can also be reduced. Instead, only a minimal amount of computational resources and a minimal amount of task-specific labelled training data are needed to fine-tune the teacher machine learning model on the particular task.

The training system described in this specification can apply knowledge distillation techniques to extract knowledge relating to the different task from the specialist feature extractor and to extract knowledge relating to the particular task from the teacher machine learning model. The extracted knowledge may be given to the student machine learning model, which may be used to perform the particular task with a comparable or even better accuracy than the teacher machine learning model, e.g., because the student machine learning model benefits from the knowledge learned by both the teacher model and the specialist feature extractor, despite being easier to deploy or using fewer computational resources than the teacher machine learning model.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a system implemented as one or more computers programs on one or more computers in one or more locations that trains a student machine learning model using a teacher machine learning model to perform a particular machine learning task.

In particular, both the student machine learning model and the teacher machine learning model are machine learning models that have been configured to receive an input and to process the received input to generate an output for the particular task. Generally, the student machine learning model is a model that has a different architecture from the teacher machine learning model that makes it easier to deploy than the teacher machine learning model, e.g., because the student machine learning model requires less computation, memory, or both, to generate outputs at run time than the teacher machine learning model. In particular, the student machine learning model has fewer layers, fewer parameters, or both than the teacher machine learning model.

For example, once trained, the student machine learning model can be deployed at an on-board system of a vehicle, e.g. an autonomous or semi-autonomous vehicle, for use in generating perception outputs such as object detection or classification outputs that can guide the overall trajectory planning process of the vehicle, as described further below with reference to FIG. 1.

Figure 1:
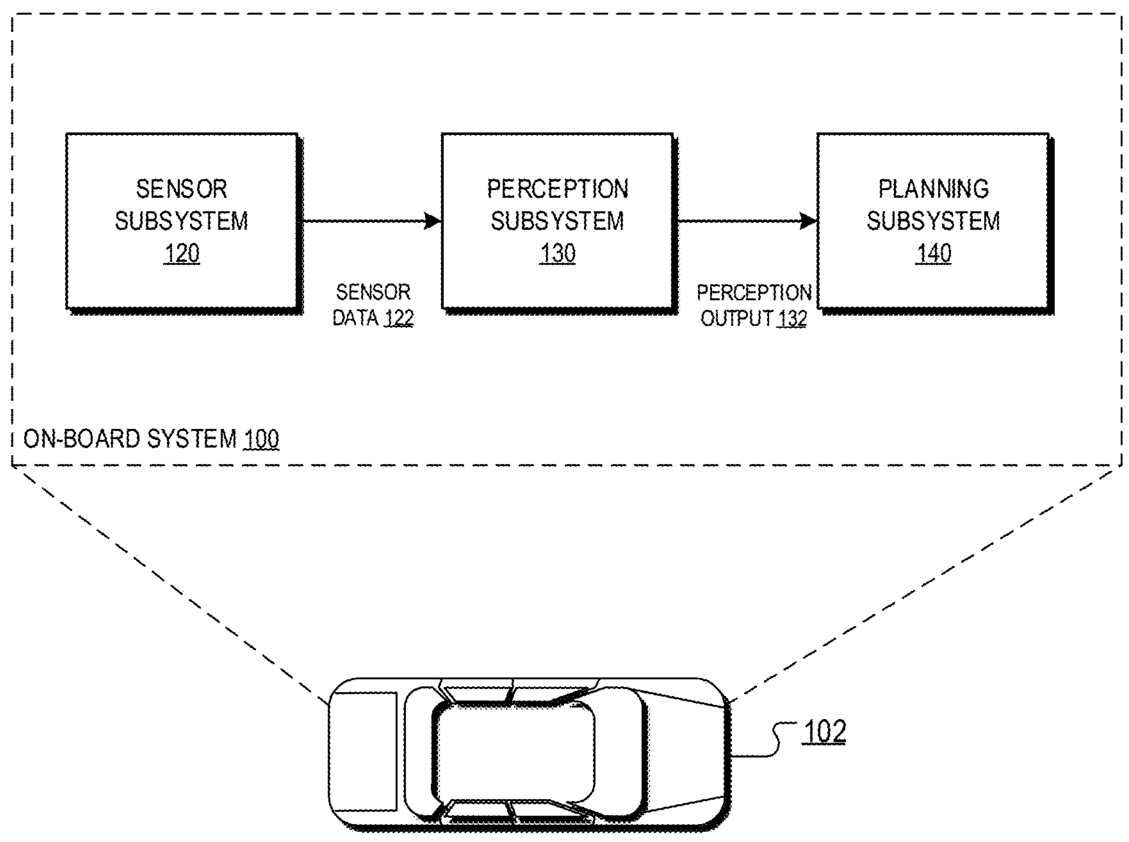
FIG. 1 is a block diagram of an example on-board system.

FIG. 1 is a block diagram of an example on-board system 100. The on-board system 100 is physically located on-board a vehicle 102. The vehicle 102 in FIG. 1 is illustrated as an automobile, but the on-board system 100 can be located on-board any appropriate vehicle type. The vehicle 102 can be a fully autonomous vehicle that makes fully-autonomous driving decisions or a semi-autonomous vehicle that aids a human operator. For example, the vehicle 102 can autonomously apply the brakes if a full-vehicle prediction indicates that a human driver is about to collide with a detected object, e.g., a pedestrian, a cyclist, or another vehicle. While the vehicle 102 is illustrated in FIG. 1 as being an automobile, the vehicle 102 can be any appropriate vehicle that uses sensor data to make fully-autonomous or semi-autonomous operation decisions. For example, the vehicle 102 can be a watercraft or an aircraft. Moreover, the on-board system 100 can include components additional to those depicted in FIG. 1 (e.g., a control subsystem or a user interface subsystem).

The on-board system 100 includes a sensor subsystem 120 which enables the on-board system 100 to "see" the environment in a vicinity of the vehicle 102. The sensor subsystem 120 includes one or more sensors, some of which are configured to receive reflections of electromagnetic radiation from the environment in the vicinity of the vehicle 102. For example, the sensor subsystem 120 can include one or more laser sensors (e.g., LIDAR sensors) that are configured to detect reflections of laser light. As another example, the sensor subsystem 120 can include one or more radar sensors that are configured to detect reflections of radio waves. As another example, the sensor subsystem 120 can include one or more camera sensors that are configured to detect reflections of visible light.

The sensor subsystem 120 repeatedly (i.e., at each of multiple time points) uses raw sensor measurements, data derived from raw sensor measurements, or both to generate sensor data 122. The raw sensor measurements indicate the directions, intensities, and distances travelled by reflected radiation. For example, a sensor in the sensor subsystem 120 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

In particular, the sensor data 122 includes point cloud data and image data that characterizes the latest state of an environment (i.e., an environment at the current time point) in the vicinity of the vehicle 102. For example, the point cloud data can be generated by using one or more LIDAR sensors or depth camera sensors of the sensor subsystem 120, while the image data can be generated by using one or more camera sensors of the sensor subsystem 120.

The on-board system 100 can provide the sensor data 122 generated by the sensor subsystem 120 to a perception subsystem 130 for use in generating perception outputs 132 that can characterize the environment, objects that are present the environment, or both in the vicinity of the vehicle 102. The objects in the vicinity of the vehicle 102 can be, for example, pedestrians, bicyclists, or other vehicles. When provided to the planning subsystem 140 of the system 100, such perception outputs 132 generally facilitate the generation of timely and accurate planning decisions which cause the vehicle 102 to travel along a safe and comfortable trajectory.

When the planning subsystem 140 receives the perception outputs 132, the planning subsystem 140 can use the perception outputs 132 to generate planning decisions which plan the future trajectory of the vehicle 102. The planning decisions generated by the planning subsystem 140 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. The planning decisions generated by the planning subsystem 140 can be provided to a control system of the vehicle 102. The control system of the vehicle can control some or all of the operations of the vehicle by implementing the planning decisions generated by the planning system. For example, in response to receiving a planning decision to apply the brakes of the vehicle, the control system of the vehicle 102 may transmit an electronic signal to a braking control unit of the vehicle. In response to receiving the electronic signal, the braking control unit can mechanically apply the brakes of the vehicle.

To this end, the perception subsystem 130 of the on-board system 100 implements components that identify objects within the vicinity of the vehicle sensor data 122. Specifically, to implement the operations of these components, the on-board system 100 can use a data processing apparatus that includes data processing hardware of any of a variety of kinds of apparatus, devices, and machines that provides a pool of computing resources for processing data. By way of example, the data processing apparatus can include a programmable processor, e.g., a central processing unit (CPU), a computer, or multiple processors or computers. The data processing apparatus can also be, or further include, special purpose logic circuitry, e.g., an FPGA (field programmable gate array) or an ASIC (application-specific integrated circuit).

The components can include a machine learning model which can have any architecture that is appropriate for the type of sensor data 122 processed by the machine learning model. For example, the perception subsystem 130 can implement an object classification neural network that is configured to process a network input that includes the sensor data 122 (e.g., an image, a point cloud, or both) and to generate as output scores for each of a set of object classes, with each score representing an estimated likelihood that the sensor data 122 contains an image or a point cloud of an object belonging to the class. As described above, examples of object classes include pedestrians, cyclists, or other vehicles near the vicinity of the vehicle 102 as it travels on a road.

As another example, the perception subsystem 130 can implement an object detection neural network that is configured to process a network input that includes the sensor data 122 (e.g., an image, a point cloud, or both) and to generate as output data defining one or more bounding boxes in the image or point cloud, and for each of the one or more bounding boxes, a respective confidence score that represents a likelihood that an object belonging to an object class from a set of one or more object classes is present in the region of the environment shown in the bounding box.

As another example, the perception subsystem 130 can implement an image segmentation neural network that is configured to process a network input that includes the sensor data 122 (e.g., an image, a point cloud, or both) and to generate as output data defining assignment of each pixel of the image (or each data point of the point cloud) to a class from a set of classes.

In some above examples, the machine learning model included in the perception subsystem 130 can be a student machine learning model that has been trained using a teacher machine learning model at a training system housed within a facility, e.g., a data center, that is physically remote from the on-board system 100 of the vehicle 102. In other words, while the perception subsystem 130 may be implemented on-board a vehicle as described above, the training system is typically hosted within the data center, which can be a distributed computing system having many, possibly hundreds or thousands of, computers in one or more location, and thus can provide more, sometimes orders of magnitude more, computing resources than that can possibly be provided by the on-board system 100. This allows for the training system to effectively run more computationally expensive teacher machine learning models, e.g., a neural network with a complex network architecture or a significant number of network parameters or both, that are impractical or otherwise infeasible for deployment at the on-board system of the vehicle 102 to compute inferences at run time, e.g., due to the inference latency, power consumption, or memory footprint of the teacher machine learning model.

By virtue of the distillation training techniques described further below with reference to FIGS. 2-4, once trained using the teacher machine learning model at the training system, the student machine learning model can be deployed on-board the vehicle to generate perception outputs that are equally as good or even better than the perception outputs generated by the teacher machine learning model despite the student model being easier to deploy or using fewer computational resources than the teacher machine learning model.

Figure 2:
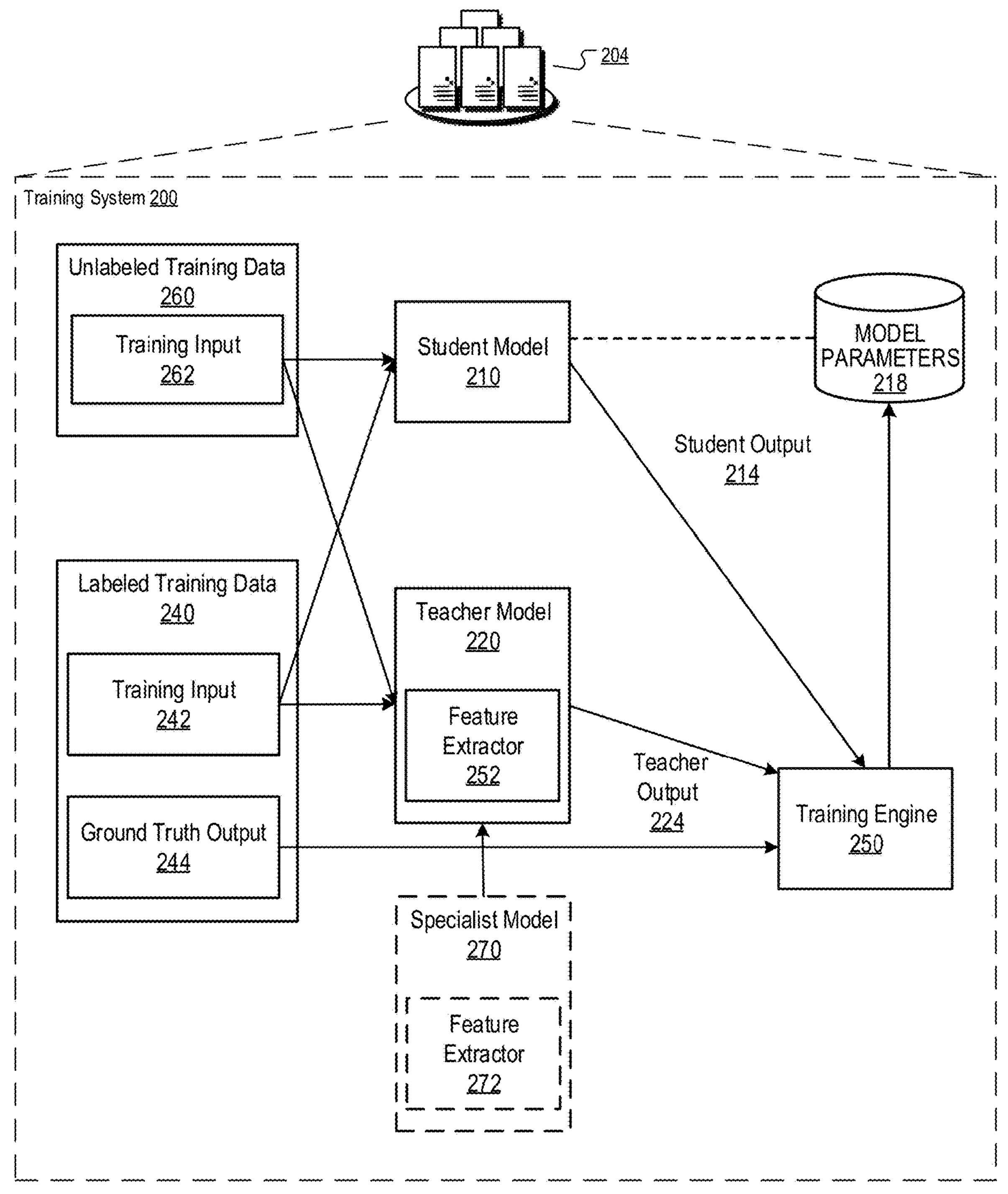
FIG. 2 is a block diagram of an example training system.

FIG. 2 shows an example training system 200. The training system 200 is an example of a system implemented as computer programs on one or more computers in one or more locations in which the systems, components, and techniques described below are implemented.

The training system 200 can be hosted within a data center 204, which can be a distributed computing system having hundreds or thousands of computers in one or more locations.

This training system 200 trains a student machine learning model 210 that has a plurality of parameters 218 to perform a particular machine learning task using knowledge distillation techniques. The parameters 218 of the student machine learning model, i.e., the parameters that are being updated by the training, will be referred to in this specification as the "student parameters."

For example, the particular task can be a visual data processing task, e.g., image (or point cloud) classification, object detection, semantic segmentation, image (or point cloud) augmentation, and so on, and the training system 200 trains the student machine learning model 210 to perform the particular task by processing an input that is specific to the task, e.g., an input that includes an image or a point cloud or both, and generates a student output 114 for the task.

The machine learning model 210 can have any architecture that is appropriate for the type of model inputs processed by the machine learning model 210. For example, when the model inputs are visual data such as image or point cloud data, the machine learning model 210 can be a neural network with one or more convolutional layers, or one or more fully connected layers. Additionally or alternatively, the machine learning model 210 can be a self-attention based neural network, e.g., a Transformer, or a recurrent neural network, e.g., a long short-term memory (LSTM) neural network, that includes one or more self-attention or recurrent layers, e.g., in place of or in addition to the convolutional or fully connected layers.

The training system 200 receives labeled training data 240 and unlabeled training data 260 for use in training the student machine learning model 210. More specifically, for a first, particular task that the training system 200 is training the student machine learning model 210 on, the labeled training data 240 includes training inputs 242 and, for each training input 242, a ground truth output 244 for the particular task. The ground truth output 244 is the output that should be generated by the student machine learning model 210 for the first task by processing the training input 242. In other words, the ground truth output 244 is a known, (presumed) accurate output for the first task. In contrast, the unlabeled training data 260 includes training inputs 262 for which information about a known, ground truth output for the first task is not specified by training data and is thus not readily available to the training system 200.

The system 200 can receive the training data in any of a variety of ways. For example, the system can receive training data as an upload from a remote user of the system over a data communication network, e.g., using an application programming interface (API) made available by the system. As another example, the system can receive an input from a user specifying which data that is already maintained by the system should be used as the training data.

Large amounts of unlabeled training data 260 are generally much more readily available to the system than the labeled training data 240, since they do not require task-specific labels and can therefore be easily collected, e.g., as the vehicle 102 navigates through the world. Thus, the system 200 can receive the unlabeled training data 260 in larger, and usually much larger, volume than that of the labeled training data 240. For example, the labeled training data 240 may include a few thousands of training inputs 242 each associated with a respective ground truth output 244, and the unlabeled training data 260 may include billions or trillions of training inputs 262 for which the ground truth output information isn't readily available to the system.

The training system 200 then uses the ground truth outputs 244 and a teacher machine learning model 220 to train the student machine learning model 210. The teacher machine learning model 220 is a cumbersome (e.g., large, or deep) machine learning model that can be computationally costly to train and can be impractical to run—particularly on a device with limited computational power or resources, e.g., the on-board system 100 of FIG. 1.

In particular, a portion of the teacher model 220 has been pre-trained as part of a different, specialist machine learning model 270 that has been configured through training to accurately perform a second machine learning task that is generally different from the first machine learning task on which the student machine learning model 210 is to be trained.

In some cases, the teacher 220 and the specialist models 270 can be configured to receive inputs that include data of a type or modality that is common to both the first and second tasks and to generate respective outputs, one for each task.

In some of these cases, the first and second tasks can be different visual data processing tasks that can be performed on the same input visual data. For example, the visual data can include image or point cloud or both. In others of these cases, the first and second tasks can be different visual data processing tasks that can be performed on different input visual data. For example, the teacher model input for the first task includes both image and point cloud data, while the specialist model input for the second task includes only image data.

The training system 200 can instantiate a portion of the teacher machine learning model 220 according to the known architecture of the different, specialist machine learning model 270 and the known, e.g., trained, values of parameters of the different, specialist machine learning model 270. When configured as a neural network, an architecture of a machine learning model can specify what layers are included in the network and their properties, as well as how the neurons of each layer of the network are connected. The parameter values of the machine learning model can, by way of example, specify weight matrices and, in some cases, bias vectors, of the fully-connected layers, and values of kernels of the convolutional layers.

In some implementations, the training system 200 can instantiate the teacher machine learning model 220 such that (i) a portion of teacher model 220 has an identical architecture to a portion of the specialist model and, (ii) for this identical portion, the associated model parameters of the teacher 220 and the specialist model 270 have identical values to one another.

In other implementations, the training system 200 can instantiate the teacher machine learning model 220 according specifically to the known architecture of the specialist machine learning model 270 such that a portion of teacher model 220 has an identical architecture to a portion of the specialist model, while the associated model parameters of the teacher model 220 have initial values, e.g., randomly initialized values, that are generally different from the known parameter values associated with that portion of the specialist model 270.

In some implementations, both teacher 220 and specialist models 270 are configured as neural networks that are each composed of a respective stack of neural network layers. In some such implementations, the training system 200 can instantiate, as a feature extractor 252 of the teacher model 220, a portion of the teacher model 220 in accordance with constituent layers of a feature extractor 272 of the specialist model 270. For example, the constituent layers of the feature extractor 272 can include an input layer and one or more intermediate layers of the specialist model 270. In this example, the specialist model 270 can use the feature extractor 272 to process an input of the second task and generate an embedding of the input, e.g., as an output at the last layer in the one or more intermediate layers, or as a combination of the outputs at the one or more intermediate layers of the specialist model 270.

In any of these implementations, the teacher machine learning model 220 can be a larger model, i.e., can have more parameters and a greater computational footprint, than the student model 210, and the system 200 can use the training process to generate a trained student model 210 that is more computationally efficient than the teacher model 220 while having comparable or better accuracy than the teacher model 220.

For example, the student model 210 does not include any similar architecture to the feature extractor 252 that is part of the teacher model 220. Instead, the student model 210 only has a smaller, substitute model component in place of the feature extractor. Thus, the student model 210 can have fewer neural network layers, and therefore fewer parameters to that of the teacher model 220.

Figure 3:
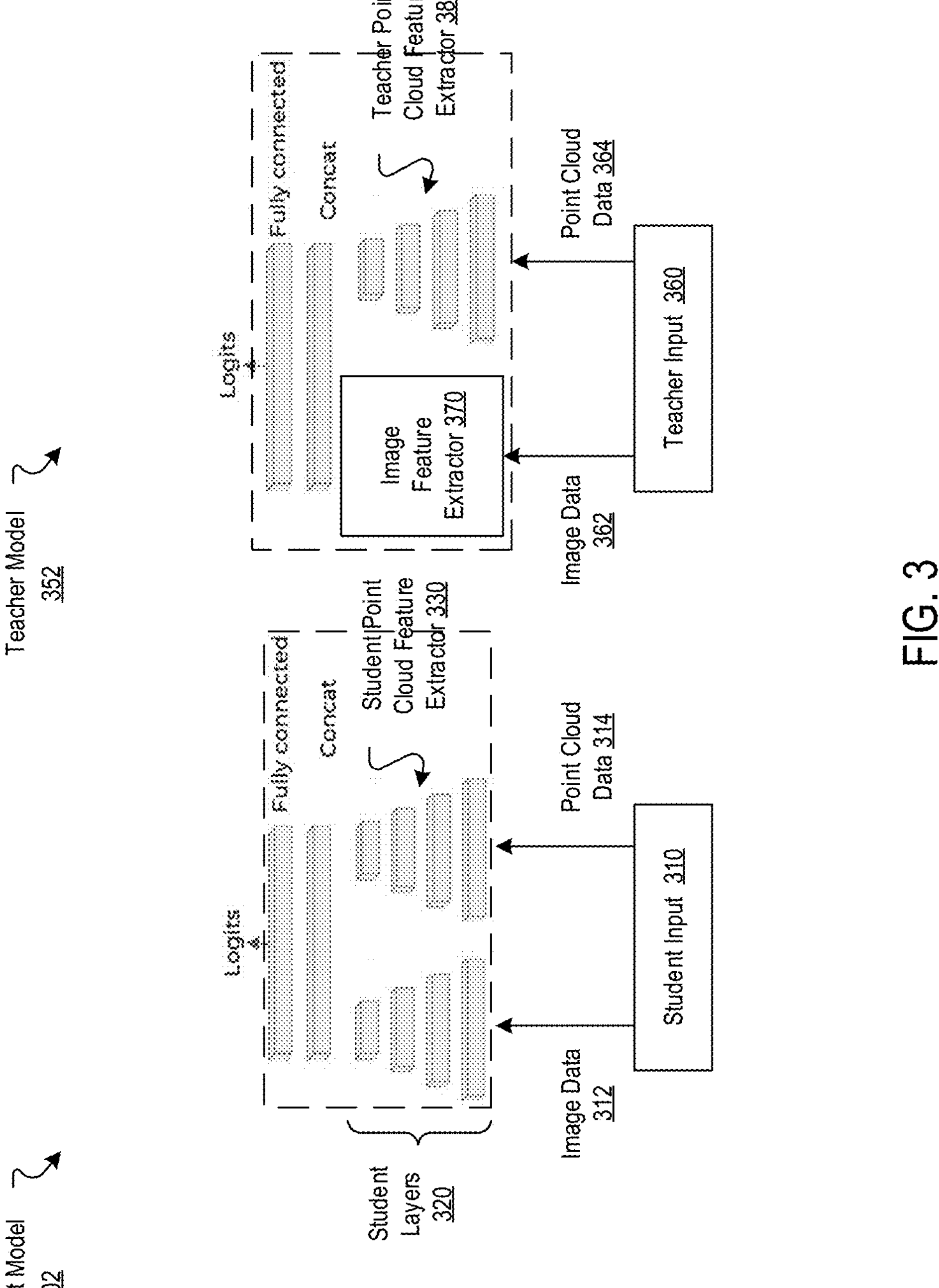
FIG. 3 is an illustration of example architectures of student and teacher machine learning models.

FIG. 3 is an illustration of example architectures of student and teacher machine learning models. In the example of FIG. 3, the student 302 and teacher 352 machine learning models are configured as respective visual data classification neural networks. Each network is configured to process a network input that includes image and point cloud data and to generate as output scores for each of a set of object classes ("logits"), with each score representing an estimated likelihood that the network input contains an image or a point cloud of an object belonging to the class. In this example, while the network inputs 310 and 360 to the student 302 and teacher 352 machine learning models both have a same data type, the actual data dimensions of the network inputs may differ. For example, the image data 312 or the point cloud data 314 included in the student input 310 may have a smaller dimensionality than the image data 362 or the point cloud data 364 included in the teacher input 360, respectively.

The teacher model 352 shown on the right hand side of FIG. 3 has an image feature extractor 370 that can process the input image data 362 in accordance with current parameter values of the image feature extractor 370 to generate an embedding of the image data 362. The teacher model 352 can then generate a teacher output by processing the embedding using the one or more layers in the network that are subsequent to the image feature extractor 370.

As described above, the image feature extractor 370 has been pre-trained as part of a different, specialist machine learning model that has been configured through training to accurately perform a machine learning task that is generally different from the machine learning task for which the teacher model 352 is configured to perform. The image feature extractor 370 typically has a complex architecture with some sophisticated layer configurations or a significant number of parameters or both. For example, the image feature extractor 370 can in turn include a stack of multiple, e.g., 100, 200, or more, convolutional neural network layers, that are configured to process image data 362 successively between them in a certain layer order to generate an embedding of the image data 362.

On the contrary, the student model 302 shown on the left hand side of FIG. 3 has a much simpler model component in place of the image feature extractor. For example, the student model 302 has an image feature extractor that is composed of merely a handful of layers 320 with relatively straightforward configurations that can generate an embedding of the image data 312.

Similarly, the student 302 and teacher 352 machine learning models have point cloud feature extractors that can process input point cloud data 314 and 364 to generate embeddings for the input point cloud data 314 and 364, respectively. The student point cloud feature extractor 330 can have a same or different, e.g., simpler, architecture than the teacher point cloud feature extractor 380. The student point cloud feature extractor 330 can also be configured to process a different format or modality of point cloud data than the teacher point cloud feature extractor 380. For example, the student point cloud feature extractor 330 can be configured to process rendered LIDAR image data, while the teacher point cloud feature extractor 380 can be configured to process 3-D point cloud data collected by using LIDAR sensors.

The student 302 and teacher 352 model can also include one or more identical layers that are shared between both networks. For example, both the student 302 and teacher 352 model have a concatenation layer and a fully connected layer stacked atop the feature extractors that are configured to receive the embeddings of the image and point data and to generate the network outputs.

After generating an instance of the teacher machine learning model 220 as described above and prior to using it to train the student model 210, a training engine 250 of the training system 200 trains the teacher model 220 on the first task by using the labeled training data 240. For example, the training engine 250 can do this by iteratively adjusting parameter values of the teacher model 220, including parameter values of the feature extractor 252, using conventional supervised learning techniques that rely on using the ground truth outputs 244 included in the labeled training data 240 as training objectives. This can prepare the teacher model 220 for training the student model 210 using knowledge distillation with a minimally required amount of labeled data that is specific to the first task.

In some implementations, the parameters of the portion that has been generated in accordance with the specialist model 270, e.g., the parameters of the feature extractor 252, remain fixed during the training of the teacher model 220. Instead, only the values of the parameters of the remaining portion of the teacher model 220 are adjusted (or fine-tuned), e.g., from initial values. In other implementations, however, the teacher model 220 in its entirety can be trained jointly during the training. That is, the values of the parameters of the feature extractor 252 are adjusted jointly with the values of the parameters of the remaining portion of the teacher machine learning model.

Next, during the training of the student model 210, a training engine 250 in the system 200 repeatedly uses ground truth outputs 244 and teacher outputs 224 generated by the now-trained teacher model 220 from the training inputs 262 to determine errors in student outputs 214 generated by the student machine learning model 210. The training engine 250 then uses the errors to update the values of the model parameters 218. Training the student model 210 using the teacher model 220 is described in more detail below with reference to FIG. 4.

Once the model 210 has been trained, the training system 200 can provide data specifying the trained model for use in processing new inputs for the first task on which it has been trained. For example, the training system 200 can output data specifying the trained model to the on-board system 100 of FIG. 1, e.g., by a wired or wireless connection. In particular, the training system 200 can provide the trained values of the model parameters 218 to a neural network included in the perception subsystem 120 for use in generating perception outputs 132 that enable the generation of timely and accurate planning decisions by the planning subsystem 140 of FIG. 1.

Alternatively or in addition to outputting the trained model data, the system 200 can instantiate an instance of the machine learning model having the trained values of the model parameters, receive inputs to be processed for the first task, e.g., through an application programming interface (API) offered by the system, use the trained model to process the received inputs to generate model outputs and then provide the generated model outputs, classification outputs, or both in response to the received inputs.

While the student machine learning model 210 is largely described as being implemented on-board a vehicle, a trained student model 210 generated by using the training system 200 can generally be implemented as computer programs on any system of one or more computers in one or more locations and the outputs generated by the student model 210 can be used for any appropriate purpose, e.g., in machine vision and/or robotics tasks.

Figure 4:
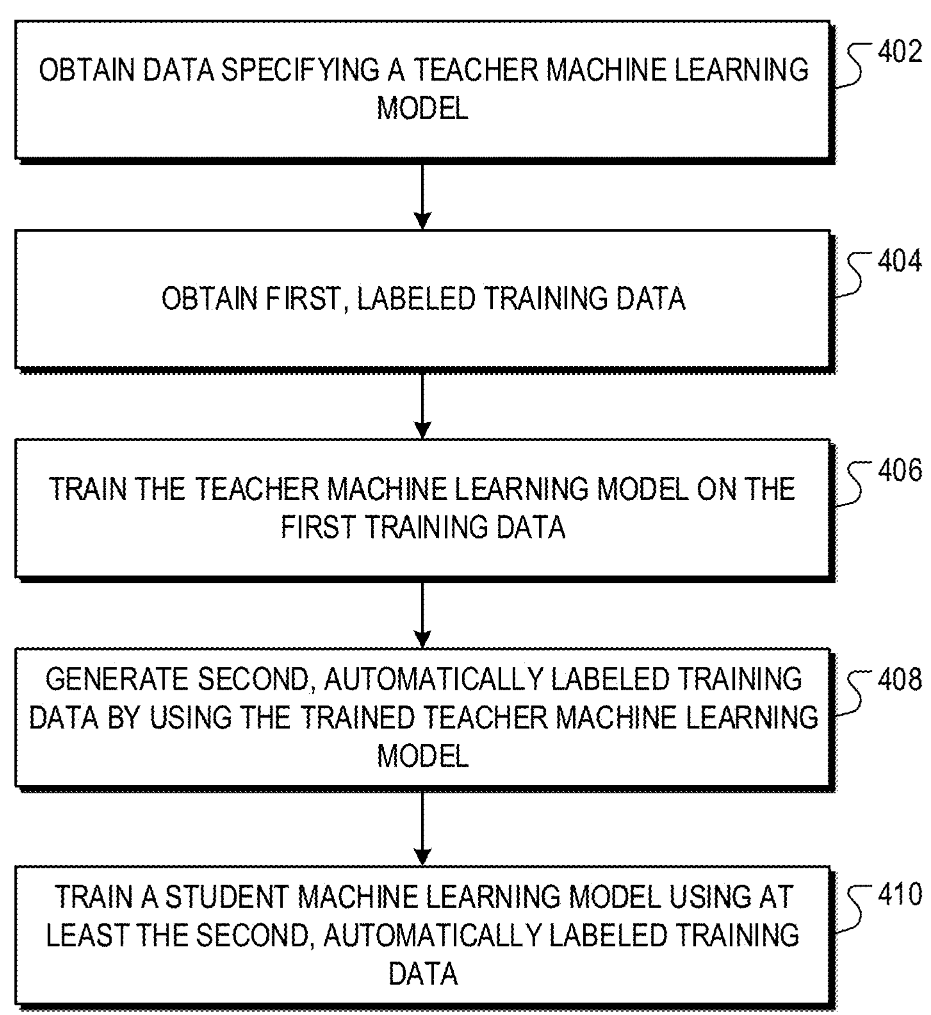
FIG. 4 is a flow diagram of an example process for training a student machine learning model.

FIG. 4 is a flow diagram of an example process 400 for training a student machine learning model. For convenience, the process 400 will be described as being performed by a system of one or more computers located in one or more locations. For example, a training system, e.g., the training system 200 of FIG. 2, appropriately programmed in accordance with this specification, can perform the process 400.

The system obtains data specifying a teacher machine learning model configured to perform a first machine learning task (402).

As described above, the teacher machine learning model has a pre-trained feature extractor that (i) is configured to receive an input image and to process the input image in accordance with the trained parameter values of the feature extractor to generate an embedding of the input image and (ii) has been pre-trained as part of a different image processing machine learning model that is configured to perform a different, second machine learning task by generating outputs for the second machine learning task from the embeddings generated by the pre-trained feature extractor.

For example, the first machine learning task can be a visual data processing task, e.g., image (or point cloud) classification, object detection, semantic segmentation, image (or point cloud) augmentation, and the second machine learning task can be any of a variety of different tasks that belong to a common domain or field of the first task. As a particular example, the first task can be a visual data classification task, and the second task can be an image understanding task such as the task of determining the relevance of different images with respect to some given text, e.g., a received search query.

Specifically, the system obtains, e.g., from a common source or from different sources, e.g., as an upload from a user of the system or from a memory device accessible to the system, (i) data specifying the architecture of the feature extractor and the already trained parameters values of the feature extractor, and (ii) data specifying the architecture of remaining portion of the teacher machine learning model and the (initial) parameters values of remaining portion of the teacher machine learning model.

The system obtains first training data including a plurality of first training inputs each associated with a ground truth output (404).

For example, each first training input can include an image, which can be a camera image captured using a camera sensor of a vehicle that characterizes a scene of the environment surrounding the vehicle. The image can depict one or more objects, e.g., pedestrians, cyclists, or other vehicles, that are present in the scene of the environment.

As another example, each first training input can include a point cloud, which can be a point cloud generated using a LIDAR sensor of the vehicle that characterizes a scene of the environment surrounding the vehicle.

As yet another example, each first training input can include both the image and the point cloud, which both characterize a same scene of the environment surrounding the vehicle.

The system trains the teacher machine learning model on the first training data to obtain a trained teacher machine learning model (406). The system can do this by using conventional supervised learning techniques that rely on using the ground truth outputs as training objectives to determine trained parameter values of the teacher machine learning model. For example, if the teacher machine learning model is a neural network, the system can use a gradient descent with backpropagation technique to iteratively adjust the values of the parameters of the teacher machine learning model.

The system generates second, automatically labeled training data by using the trained teacher machine learning model to process, in accordance with the trained parameter values of the teacher machine learning model, unlabeled training data including a plurality of second training inputs to generate a pseudo ground truth output for each second training input (408).

In implementations where the first machine learning task is a classification task, the pseudo ground truth output can be either a soft or hard target output. As described above, to perform the classification task, the teacher or student machine learning model is configured to generate a score for each of a set of classes, with the score for a given class representing a probability that the input visual data contains an image (or a point cloud) of an object that belongs to the class.

In some of these implementations, the system can configure the teacher machine learning model to generate soft target outputs from the second training inputs. A soft output of a machine learning model for a given input includes a respective soft score for each of the classes that is generated by the last layer, e.g., a softmax layer, of the machine learning model. The soft scores are the actual scores generated by the machine learning model for the input using current (e.g., trained) values of the parameters of the machine learning model.

In others of these implementations, the system can configure the teacher machine learning model to generate hard target outputs from the second training inputs. A hard target for a training input is a set of scores that includes a 1 for each correct or known class for the training input, i.e., each class that the training input should be classified into by the student machine learning model, and a 0 for each other class. For a given second training input, to generate the hard target output, the system can assign a 1 to the class with the highest actual score generated by the teacher model among the set of classes, or assign a 1 to the class that is sampled from all classes in accordance with the actual scores generated by the teacher model for the set of classes.

In some above implementations, the system can generate the second, automatically labeled training data by additionally applying data balancing techniques to improve the quality of the training. When the first task is a classification task, as one example, the data balancing techniques can be class balancing techniques. Generating a balanced training dataset for classification tasks can, in some cases, improve the training of the student model, e.g., such that it is not biased toward one particular class among all possible classes.

Specifically, the system can do this by oversampling the second training inputs of a minority class (as classified by using the teacher model). For example, a minority class can be a particular class into which a relatively small number of second training inputs have been classified. As another example, a minority class can be a particular class that has fewer second training inputs than the first training inputs. To perform oversampling of a minority class, the system can use the teacher model to generate duplicated pseudo ground truth outputs for a single second training input.

Additionally or alternatively, the system can do this by undersampling the second training inputs of a majority class. For example, a majority class can be a particular class into which a relatively significant number of second training inputs have been classified, or a particular class that has more second training inputs than the first training inputs. To perform undersampling of a majority class, the system can select a subset of the pseudo ground truth outputs generated for the second training inputs, for example, through random sampling or according to values of the pseudo ground truth outputs, for example selecting the pseudo ground truth outputs with the highest values generated by using the teacher model. In either example, the system can thereafter use only the pseudo ground truth outputs in the selected subset to train the student model.

The system trains a student machine learning model to perform the machine learning task using at least the second, automatically labeled training data (410). As described above, the student machine learning model does not include (an instance of) the pre-trained feature extractor and instead includes a different feature extractor having fewer parameters than the pre-trained feature extractor. Thus, the student model, once trained, is feasible for deployment on a device with limited computational power or resources, e.g., the on-board system of a vehicle, to compute inferences at run time.

The system can do this by training the student machine learning model to generate student training outputs for the second training inputs that match the pseudo target outputs generated by the teacher model for the second training inputs.

Specifically, for each second training input, the system processes the second training input using the student machine learning model to generate a student training output for the training input in accordance with current values of the student parameters. The system then determines an error, e.g., a cross-entropy loss, between the teacher soft target output for the second training input and the student training output for the training input. The system then uses the error to adjust the values of the student parameters, e.g., using conventional machine learning training techniques. For example, if the student machine learning model is a deep neural network, the system can use a gradient descent with backpropagation technique to adjust the values of the student parameters.

Additionally or alternatively, the system can train the student machine learning model using hard targets generated by the teacher model for the second training inputs. That is, for each second training input, the system determines an error between the teacher hard target output for the second training input and the student training output for the second training input, and then uses the error to adjust the values of the student parameters.

In some implementations, the system fine-tunes the student machine learning model on the first task using the first training data, i.e., the labeled training data that has been used to train the teacher model, after training the student machine learning model using the second training data and the teacher machine learning model. Fine-tuning the student model can, in some cases, further improve the performance of the final trained model with a minimally required amount of labeled data that is specific to the first task.

Specifically, for a given first training input, the system processes the first training input using the student machine learning model to generate a student training output for the first training input in accordance with current (e.g., trained) values of the student parameters. The system then determines an error between the known, ground truth output for the first training input and the student training output for the first training input. The system then uses the error to fine-tune, i.e., adjust, values of the student parameters, e.g., using conventional machine learning training techniques.

In some above implementations, the system can interleave the training of the student model with embedding training by using the target embeddings generated by the feature extractor of the teacher model for the second training inputs. This can, in some cases, improve the training of the student model without requiring additional training data.

Specifically, for a given second training input, the system processes the second training input using the teacher machine learning model to generate a target embedding for the second training input. As described above, an embedding is an ordered collection of numeric values that represents an input in a particular embedding space. An embedding can be a data structure, e.g., a vector, of floating point or other numeric values that has a fixed dimensionality and that is generated by the last (one or more) layer(s) of the feature extractor of the teacher model in accordance with the trained values of the parameters of the feature extractor. Similarly, the system processes the second training input using the different feature extractor of the student machine learning model to generate a student training embedding for the second training input, i.e., in accordance with the current values of the parameters of the different feature extractor.

The system determines an error, e.g., an L-2 loss, between the teacher target embedding for the second training input and the student training embedding for the second training input, and then uses the error to adjust the parameter values of the different feature extractor of the student machine learning model.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a computer-implemented method comprising:

- obtaining data specifying a teacher machine learning model configured to perform a machine learning task, wherein the teacher machine learning model has a pre-trained feature extractor that (i) is configured to receive an input image and to process the input image to generate an embedding of the input image and (ii) has been pre-trained as part of a different image processing neural network that is configured to perform a different machine learning task by generating outputs for the different machine learning task from the embeddings generated by the pre-trained feature extractor;
- obtaining first training data comprising a plurality of first training inputs each associated with a ground truth output;
- training the teacher machine learning model on the first training data to obtain a trained teacher machine learning model;
- generating second, automatically labeled training data by using the trained teacher machine learning model to process unlabeled training data comprising a plurality of second training inputs to generate a pseudo ground truth output for each second training input; and
- training a student machine learning model to perform the machine learning task using at least the second, automatically labeled training data, wherein the student machine learning model does not include the pre-trained feature extractor and instead includes a different feature extractor having fewer parameters than the pre-trained feature extractor.

Embodiment 2 is the method of embodiment 1, wherein the teacher machine learning model is configured to perform the machine learning task by processing a teacher model input comprising the input image and point cloud data.

Embodiment 3 is the method of any one of embodiments 1 or 2, wherein training the teacher machine learning model on the first training data to obtain the trained teacher machine learning model comprises:

- processing the first training input using the pre-trained feature extractor to generate an embedding of the first training input;
- generating a teacher model training output for the machine learning task from the embedding of the first training input; and
- determining an update to parameter values of the teacher machine learning model based on a difference between the teacher model training output and the ground truth output associated with the first training input.

Embodiment 4 is the method of any one of embodiments 1-3, wherein the pseudo ground truth output for each second training input is a soft target output.

Embodiment 5 is the method of any one of embodiments 1-3, wherein the pseudo ground truth output for each second training input is a hard target output.

Embodiment 6 is the method of any one of embodiments 1-5, wherein training the student machine learning model to perform the machine learning task comprises fine-tuning the student machine learning model using the first training data after training the student machine learning model using the second, automatically labeled training data.

Embodiment 7 is the method of any one of embodiments 1-6, wherein the unlabeled training data has a larger volume than that of the first training data.

Embodiment 8 is the method of any one of embodiments 1-7, wherein generating the second, automatically labeled training data comprises applying data balancing techniques including class balancing techniques.

Embodiment 9 is the method of embodiment 8, wherein the class balancing techniques comprise one or more of:

- generating duplicated pseudo ground truth outputs for a single second training input,
- randomly sampling a subset of the pseudo ground truth outputs from the pseudo ground truth outputs generated for the plurality of second training inputs, or
- selecting the subset of the pseudo ground truth outputs according to values of the pseudo ground truth outputs.

Embodiment 10 is the method of any one of embodiments 1-9, further comprising deploying the student machine learning model at an on-board system of a vehicle.

Embodiment 11 is the method of embodiment 10, wherein:

- the machine learning task comprises a image classification task; and
- the student machine learning model is configured to perform the image classification task by processing input data generated by one or more camera sensors of the vehicle.

Embodiment 12 is the method of any one of embodiments 1-11, wherein the different machine learning task performed by the different image processing neural network comprises an image understanding task.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:

obtaining data specifying a pre-trained feature extractor that (i) is configured to receive an input image and to process the input image to generate an embedding of the input image and (ii) has been pre-trained as part of an image processing neural network that is configured through training to perform an image processing machine learning task by generating outputs for the image processing machine learning task from the embeddings generated by the pre-trained feature extractor, wherein the data specifying the pre-trained feature extractor comprises data specifying pre-trained values of parameters of the pre-trained feature extractor that have been determined as a result of the training of the image processing neural network;

generating, based on the data specifying the pre-trained feature extractor, a teacher machine learning model configured to perform a target machine learning task, wherein the target machine learning task is different from the image processing machine learning task that the image processing neural network is configured to perform, and wherein the teacher machine learning model comprises the pre-trained feature extractor having parameters that have the pre-trained values and a remaining portion having parameters that have initial values;

obtaining first training data comprising a plurality of first training inputs each associated with a ground truth output;

training the teacher machine learning model that comprises the pre-trained feature extractor and the remaining portion to perform the target machine learning task on the first training data to obtain a trained teacher machine learning model, wherein training the teacher machine learning model comprises updating values of parameters of the teacher machine learning model from the pre-trained values of the parameters of the pre-trained feature extractor and from the initial values of the parameters of the remaining portion, and wherein training the teacher machine learning model comprises holding the parameters of the pre-trained feature extractor fixed to the pre-trained values while updating the initial values of the parameters of the remaining portion;

generating second, automatically labeled training data by using the trained teacher machine learning model to process unlabeled training data comprising a plurality of second training inputs to generate, for each second training input, a pseudo ground truth output that is a target output that should be generated by a student machine learning model from processing the second training input; and training the student machine learning model to perform the target machine learning task using at least the second, automatically labeled training data, wherein the student machine learning model does not include the pre-trained feature extractor included in the teacher machine learning model, and instead includes a different feature extractor having fewer parameters than the pre-trained feature extractor.

2. The method of claim 1, wherein the teacher machine learning model is configured to perform the target machine learning task by processing a teacher model input comprising the input image and point cloud data.

3. The method of claim 1, wherein training the teacher machine learning model on the first training data to obtain the trained teacher machine learning model comprises:

processing the first training input using the pre-trained feature extractor to generate an embedding of the first training input;

generating a teacher model training output for the target machine learning task from the embedding of the first training input; and training the teacher machine learning model based on a difference between the teacher model training output and the ground truth output associated with the first training input.

4. The method of claim 1, wherein the pseudo ground truth output for each second training input is a soft target output.

5. The method of claim 1, wherein the pseudo ground truth output for each second training input is a hard target output.

6. The method of claim 1, wherein training the student machine learning model to perform the target machine learning task comprises fine-tuning the student machine learning model using the first training data after training the student machine learning model using the second, automatically labeled training data.

7. The method of claim 1, wherein the unlabeled training data has a larger volume than that of the first training data.

8. The method of claim 1, wherein generating the second, automatically labeled training data comprises applying data balancing techniques including class balancing techniques.

9. The method of claim 8, wherein the class balancing techniques comprise one or more of:

generating duplicated pseudo ground truth outputs for a single second training input, randomly sampling a subset of the pseudo ground truth outputs from the pseudo ground truth outputs generated for the plurality of second training inputs, or selecting the subset of the pseudo ground truth outputs according to values of the pseudo ground truth outputs.

10. The method of claim 1, further comprising deploying the student machine learning model at an on-board system of a vehicle.

11. The method of claim 10, wherein:

the target machine learning task comprises an image classification task; and the student machine learning model is configured to perform the image classification task by processing input data generated by one or more camera sensors of the vehicle.

12. The method of claim 1, wherein the different machine learning task performed by the different image processing neural network comprises an image understanding task.

13. A system comprising one or more computers and one or more storage devices storing instructions that are operable, when executed by the one or more computers, to cause the one or more computers to perform operations comprising:

obtaining data specifying a pre-trained feature extractor that (i) is configured to receive an input image and to process the input image to generate an embedding of the input image and (ii) has been pre-trained as part of an image processing neural network that is configured through training to perform an image processing machine learning task by generating outputs for the image processing machine learning task from the embeddings generated by the pre-trained feature extractor, wherein the data specifying the pre-trained feature extractor comprises data specifying pre-trained values of parameters of the pre-trained feature extractor that have been determined as a result of the training of the image processing neural network;

generating, based on the data specifying the pre-trained feature extractor, a teacher machine learning model configured to perform a target machine learning task, wherein the target machine learning task is different from the image processing machine learning task that the image processing neural network is configured to perform, and wherein the teacher machine learning model comprises the pre-trained feature extractor having parameters that have the pre-trained values and a remaining portion having parameters that have initial values;

obtaining first training data comprising a plurality of first training inputs each associated with a ground truth output;

training the teacher machine learning model that comprises the pre-trained feature extractor and the remaining portion to perform the target machine learning task on the first training data to obtain a trained teacher machine learning model, wherein training the teacher machine learning model comprises updating values of parameters of the teacher machine learning model from the pre-trained values of the parameters of the pre-trained feature extractor and from the initial values of the parameters of the remaining portion, and wherein training the teacher machine learning model comprises holding the parameters of the pre-trained feature extractor fixed to the pre-trained values while updating the initial values of the parameters of the remaining portion;

generating second, automatically labeled training data by using the trained teacher machine learning model to process unlabeled training data comprising a plurality of second training inputs to generate, for each second training input, a pseudo ground truth output that is a target output that should be generated by a student machine learning model from processing the second training input; and training the student machine learning model to perform the target machine learning task using at least the second, automatically labeled training data, wherein the student machine learning model does not include the pre-trained feature extractor included in the teacher machine learning model, and instead includes a different feature extractor having fewer parameters than the pre-trained feature extractor.

14. The system of claim 13, wherein the teacher machine learning model is configured to perform the target machine learning task by processing a teacher model input comprising the input image and point cloud data.

15. The system of claim 13, wherein training the teacher machine learning model on the first training data to obtain the trained teacher machine learning model comprises:

processing the first training input using the pre-trained feature extractor to generate an embedding of the first training input;

generating a teacher model training output for the target machine learning task from the embedding of the first training input; and determining an update to parameter values of the teacher machine learning model based on a difference between the teacher model training output and the ground truth output associated with the first training input.

16. The system of claim 13, wherein training the student machine learning model to perform the target machine learning task comprises fine-tuning the student machine learning model using the first training data after training the student machine learning model using the second, automatically labeled training data.

17. The system of claim 13, wherein the unlabeled training data has a larger volume than that of the first training data.

18. The system of claim 13, wherein generating the second, automatically labeled training data comprises applying data balancing techniques including class balancing techniques.

19. The system of claim 18, wherein the class balancing techniques comprise one or more of:

generating duplicated pseudo ground truth outputs for a single second training input, randomly sampling a subset of the pseudo ground truth outputs from the pseudo ground truth outputs generated for the plurality of second training inputs, or selecting the subset of the pseudo ground truth outputs according to values of the pseudo ground truth outputs.

20. One or more computer storage media encoded with instructions that, when executed by one or more computers, cause the one or more computers to perform operations comprising:

obtaining data specifying a pre-trained feature extractor that (i) is configured to receive an input image and to process the input image to generate an embedding of the input image and (ii) has been pre-trained as part of an image processing neural network that is configured through training to perform an image processing machine learning task by generating outputs for the image processing machine learning task from the embeddings generated by the pre-trained feature extractor, wherein the data specifying the pre-trained feature extractor comprises data specifying pre-trained values of parameters of the pre-trained feature extractor that have been determined as a result of the training of the image processing neural network;

generating, based on the data specifying the pre-trained feature extractor, a teacher machine learning model configured to perform a target machine learning task, wherein the target machine learning task is different from the image processing machine learning task that the image processing neural network is configured to perform, and wherein the teacher machine learning model comprises the pre-trained feature extractor having parameters that have the pre-trained values and a remaining portion having parameters that have initial values;

obtaining first training data comprising a plurality of first training inputs each associated with a ground truth output;

training the teacher machine learning model that comprises the pre-trained feature extractor and the remaining portion to perform the target machine learning task on the first training data to obtain a trained teacher machine learning model, wherein training the teacher machine learning model comprises updating values of parameters of the teacher machine learning model from the pre-trained values of the parameters of the pre-trained feature extractor and from the initial values of the parameters of the remaining portion, and wherein training the teacher machine learning model comprises holding the parameters of the pre-trained feature extractor fixed to the pre-trained values while updating the initial values of the parameters of the remaining portion;

generating second, automatically labeled training data by using the trained teacher machine learning model to process unlabeled training data comprising a plurality of second training inputs to generate, for each second training input, a pseudo ground truth output that is a target output that should be generated by a student machine learning model from processing the second training input; and training the student machine learning model to perform the target machine learning task using at least the second, automatically labeled training data, wherein the student machine learning model does not include the pre-trained feature extractor included in the teacher machine learning model, and instead includes a different feature extractor having fewer parameters than the pre-trained feature extractor.

* * * * *